United States Patent [19]

Taig

[11] 4,222,282
[45] Sep. 16, 1980

[54] RACK AND PINION TEETH CONFIGURATION

[75] Inventor: Alistair G. Taig, South Bend, Ind.

[73] Assignee: The Bendix Corporation, Southfield, Mich.

[21] Appl. No.: 909,142

[22] Filed: May 24, 1978

[51] Int. Cl.² ............................................. F16H 55/08
[52] U.S. Cl. ....................................... 74/457; 74/410; 74/422; 74/462
[58] Field of Search ................ 74/457, 422, 437, 462, 74/410

[56] References Cited

U.S. PATENT DOCUMENTS

| 3,180,172 | 4/1965 | Leggatt | 74/462 |
| 3,267,763 | 8/1966 | Merritt | 74/422 |
| 3,371,552 | 3/1968 | Soper | 74/462 |
| 3,753,378 | 8/1973 | Bishop | 74/422 |

*Primary Examiner*—Leslie Braun
*Assistant Examiner*—Conrad Berman
*Attorney, Agent, or Firm*—Paul David Schoenle; Ken C. Decker

[57] ABSTRACT

The present invention relates to the gear configuration between a pinion and a rack. The pinion forms a plurality of teeth which are received in respective grooves on the rack. The teeth each define a pair of flanks which oppose a pair of surfaces within the groove and the flanks and surfaces substantially define circular arcs. The radius of curvature of the circular arc for the surfaces is slightly larger than the radius of curvature of the circular arc for the flanks. A separating force is generated between the pinion and the rack when rotation of the pinion imparts transverse movement to the rack and the circular arcs of matching surfaces and flanks cooperate to substantially eliminate the separating forces after slight separation between the pinion and the rack.

3 Claims, 5 Drawing Figures

RACK AND PINION TEETH CONFIGURATION

BACKGROUND OF THE INVENTION

In a rack and pinion gear assembly a plurality of gear teeth on the pinion cooperate with a plurality of grooves on the rack to impart transverse movement to the rack upon rotation of the pinion, such as illustrated in U.S. Pat. Nos. 3,753,378 and 3,267,763. The torque applied to the pinion to provide for rotation of the same is transmitted to the rack via the gear teeth. Generally, the gear teeth also generate a separating force tending to separate the rack from the pinion, so that a rather strong spring is required to bias the rack into engagement with the pinion. As a result, frictional forces at the engagement between the pinion and the rack oppose rotation of the pinion and movement of the rack, so that considerable effort is required to rotate the pinion.

SUMMARY OF THE INVENTION

The present invention covers an improvement in a rack and pinion gear assembly wherein a helical pinion is rotatable to impart transverse movement to a rack via gear teeth on the pinion which are received in grooves on the rack. In particular, the gear teeth are formed with circular flanks having a radius of curvature with a center disposed within the gear teeth. A flat end separates the flanks. The rack grooves define circular surfaces which oppose the circular flanks and the radius of curvature for the circular surfaces is slightly larger than that for the circular flanks.

When a torque is applied to the pinion to impart transverse movement to the rack, a separating force is created at the contact between the flank and the surface, thereby moving the rack against a spring biasing the rack toward the pinion. As a result, the contact between the flank and the surface is moved to a point on the flank surface where the separating force is substantially eliminated. In view of the circular profiles of the flank and surface, a small amount of separation between the pinion and the rack will substantially eliminate or equate the separating force with the spring force. Moreover, although the force transmitted from the pinion to the rack is increased in a torque-applied position, the separating forces between the rack and pinion are not correspondingly increased as slight separation between the rack and pinion changes the direction of the applied force to compensate for increased torque.

It is an object of the present invention to vary the pressure angle between the gear teeth and the rack as a function of pinion load or torque in order to minimize the tendency for separation between the pinion and rack, and also to enable the use of a weak spring to bias the rack into engagement with the pinion.

It is a further object of the present invention to provide a gear tooth configuration which increases the bending strength of the gear tooth so that smaller gear teeth can be used to increase the efficiency of the gear tooth configuration.

DETAILED DESCRIPTION

Figure 1:
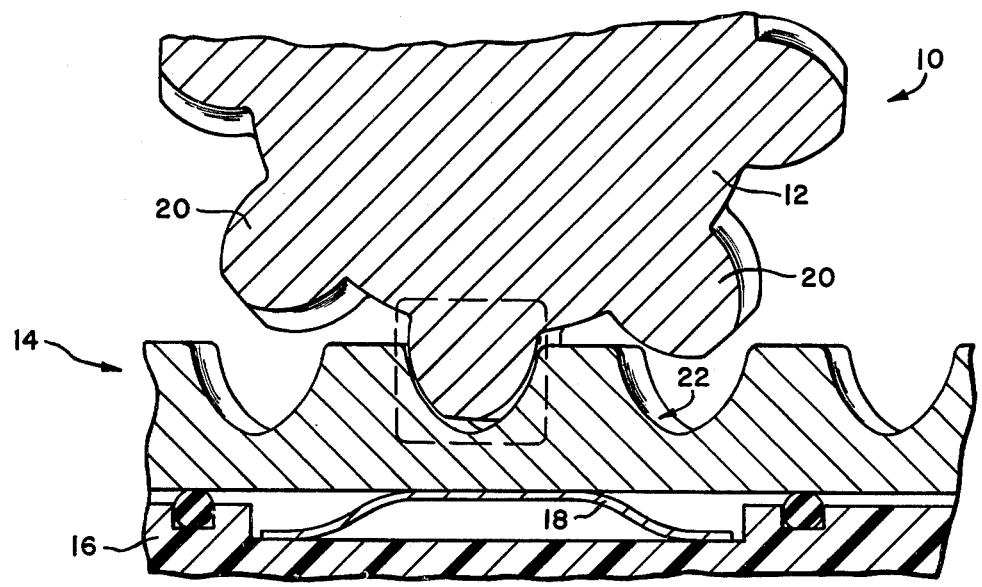
FIG. 1 is a normal section view through a pinion and rack assembly.
Figure 5:
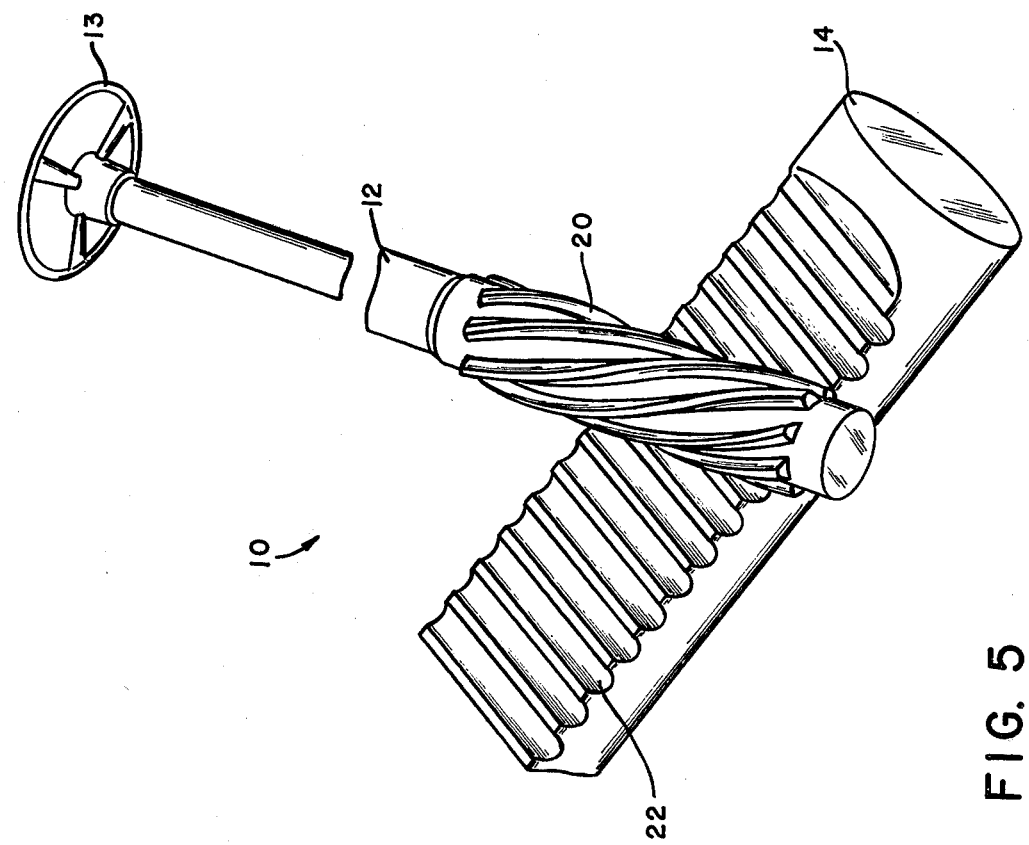
FIG. 5 is an oblique view of a portion of the rack and pinion assembly shown in FIG. 1.

In FIG. 5 a helical pinion 10 comprises a shaft 12 which is coupled to a steering wheel 13 by any conventional means and which is also coupled to a rack 14. Referring now to FIG. 1, the rack 14 is movably supported in a housing 16, only a portion of which is shown, and a spring member 18 operates to bias the rack 14 into engagement with the pinion 10. The pinion 10 includes a plurality of gear teeth 20 extending radially from the shaft 12 and the rack 14 includes a plurality of grooves 22 for receiving the plurality of gear teeth 20 in meshing engagement.

Figure 2:
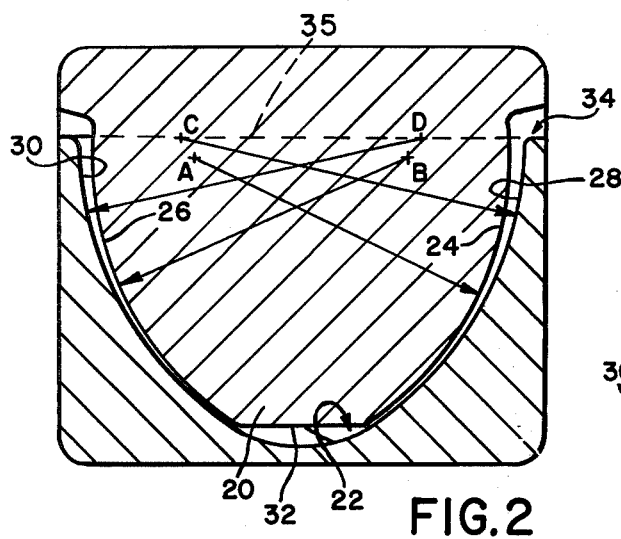
FIG. 2 is an enlarged view of a tooth and groove in a rack and pinion assembly.

Turning to FIG. 2, a single gear tooth 20 is shown extending into a groove 22 in a non-contacting position. The gear tooth 20 forms a right and left flank 24 and 26, respectively. In accordance with the invention, the flanks 24 and 26 form a convex circular curve or arc, point A being the center of the radius of curvature for the right flank 24 and point B being the center of the radius of curvature for the left flank 26. In addition, the groove 22 forms a right surface 28 and a left surface 30 which form concave circular curves or arcs, point C being the center of the radius of curvature for the right surface 28 and point D being the center of the radius of curvature for the left surface 30. The radius of curvature for the right and left surfaces 24 and 26, respectively, is slightly larger than the radius of curvature for the right and left flanks 28 and 30, respectively. The difference in radius lengths can be 1 to 15% depending on the size of the rack and pinion while a preferred radius difference is about 5%.

The gear teeth 20 form flat ends 32 which permit meshing of the gear teeth 20 with the grooves 22 as the pinion 10 is being rotated. Although one gear tooth 20 is shown in contact with the rack, it is understood that more than one gear tooth is engaged with the rack over the length of the helical pinion.

Figure 3:
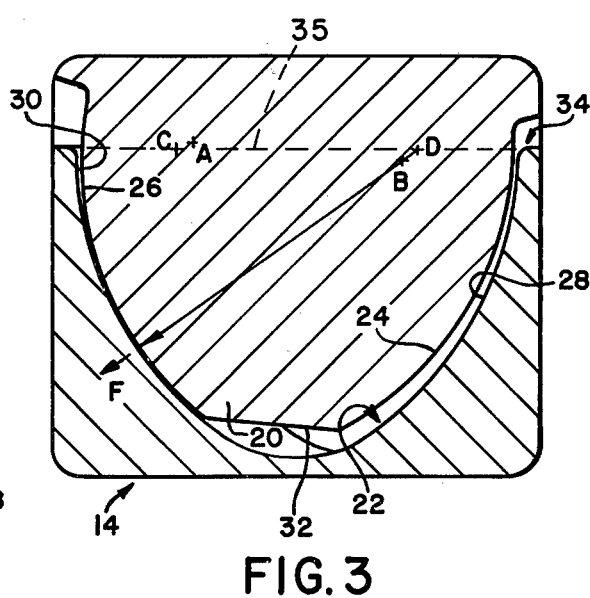
FIG. 3 is an enlarged view of the encircled portion of FIG. 1 showing the rack and pinion in a low torque-applied position.
Figure 4:
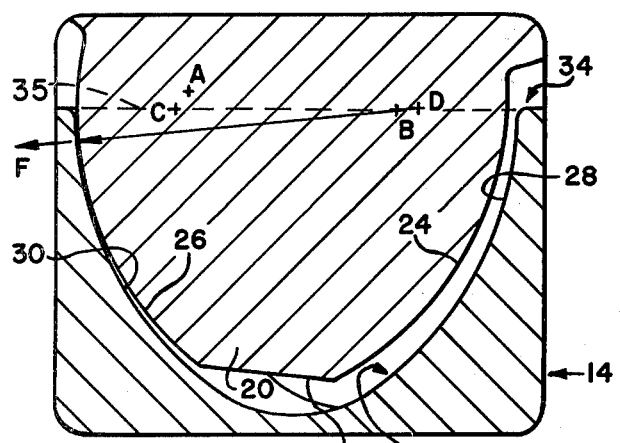
FIG. 4 is an enlarged view similar to FIG. 3 and showing the rack and pinion in an increased torque-applied position.

Turning to FIG. 3, the pinion can be subjected to a small torque to impart transverse movement to the rack 14. As illustrated, the normal force F transmitted from the gear tooth 20 to the left surface 30 includes a vertical component urging the rack to compress the spring 18 and to separate the rack from the pinion. When the torque applied to the pinion 10 is increased as shown in FIG. 4, the vertical component of the force F increases slightly to move the rack away from the pinion against the spring 18. As a result, the application of the force F is moved along flank 26 and surface 30 toward the top 34 of the rack 14. Because of the circular shape of the left flank 26 and the left surface 30, the force F is redirected upon separation of the rack and pinion from an angle of about 35° relative to the horizontal in FIG. 3 to an angle of about 5° relative to the horizontal in FIG. 4. Consequently, substantially all of the force F is directed transversely to impart movement to the rack. As the centers B and D are adjacent each other, a slight amount of separation between the rack and pinion will cause a large change in the direction of the force F. This follows from the geometry of the surface 30 and flank 26, because the direction of the force F will always intersect the centers B and D. It should be noted that the centers of curvature C and D of concave surfaces 28 and 30 are located substantially in the plane as seen edgewise and indicated in FIGS. 2-4 by dashed line 35, which plane substantially coincides with the top 34 of the rack 14.

In view of the compensation for the separating forces between the rack and pinion during high loads with slight separation therebetween, it is possible to reduce the spring load of spring 18 to permit slight separation between the rack and pinion during loading of the pinion. The benefit obtained from employing a weak spring is that friction generated between the engagement of the rack and the pinion at low loads is reduced to provide for higher mechanical efficiency.

Furthermore, the circular shape of the flanks and surfaces may deviate slightly from the circular configuration illustrated while still retaining the aforementioned features.

As the rack slightly separates from the pinion during high loads, friction between the engagement of the rack and pinion opposes separation to assist the spring 18 in maintaining engagement between the gear teeth and grooves. In addition, the theoretical optimum tooth and groove configuration for transferring forces would provide for the tooth to completely fill the groove. However, sliding friction and the mesh between tooth and groove limit the practical application of this complete engagement. With the configuration illustrated in the foregoing description, it is believed that the theoretical optimum configuration is closely met while providing a workable design under the constraints of friction and mesh.

When the pinion 10 is rotated in a counterclockwise direction, the normal force between the pinion and the rack will be transmitted from flank 24 to surface 28 in a similar manner as mentioned above.

Although many variations of the present invention are possible by one skilled in the art, it is intended that these variations fall within the scope of the appended claims.

I claim:

1. A rack and pinion steering mechanism comprising:
   a rotatable pinion member comprising a shaft for connecting with a steering wheel, the shaft having a plurality of helical teeth extending radially therefrom, each of the teeth defining a pair of substantially circular convex flanks thereon;
   a rack member translatable in response to rotation of the pinion member and comprising a plurality of grooves for receiving corresponding teeth, each of the grooves defining a pair of substantially circular concave surfaces thereon, the radius of curvature of the concave surfaces being larger than the radius of curvature of the convex flanks, the pinion and rack members separating slightly in response to rotational torque applied to the pinion member, the rack and pinion members having a partially loaded position wherein the flanks and the surfaces cooperate to create a separating force tending to separate the rack and pinion members in response to rotational torque applied to the pinion member, the members also having a fully loaded position wherein the flanks and the surfaces cooperate to substantially eliminate the separating force;
   a housing for movably supporting the rack member; and
   resilient means disposed between the housing and the rack member for allowing slight separation between the rack member and the pinion member from the partially loaded position to the fully loaded position and for biasing the rack member toward the pinion member to resist the separation of the members.

2. The steering mechanism of claim 1 wherein the rack member includes a top surface facing the pinion, and the top surface defining a plane within which the centers of radius for the rack member surfaces are substantially disposed.

3. The steering mechanism of claim 1 wherein a flank is engageable with a surface in the partially loaded position at an angle relative to the rack of about 35° and the flank is engageable with the surface in the fully loaded position at an angle relative to the rack of about 5°.

* * * * *